Patented Feb. 9, 1926.

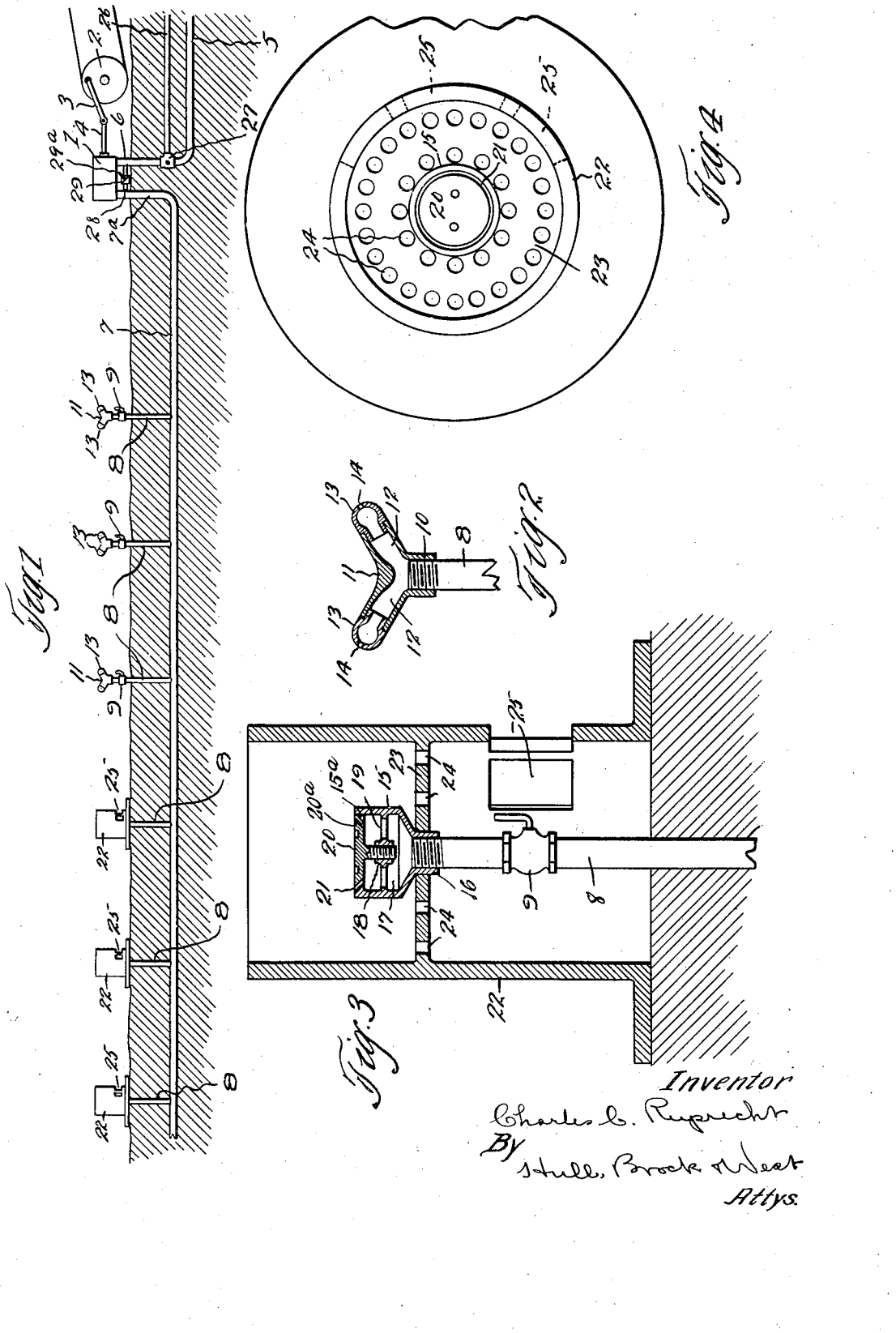

1,571,969

UNITED STATES PATENT OFFICE.

CHARLES C. RUPRECHT, OF ORLANDO, FLORIDA.

COMBINED IRRIGATING AND FROST-PROTECTING SYSTEM.

Application filed March 5, 1923. Serial No. 623,005.

*To all whom it may concern:*

Be it known that I, CHARLES C. RUPRECHT, a citizen of the United States, residing at Orlando, in the county of Orange and State of Florida, have invented a certain new and useful Improvement in Combined Irrigating and Frost-Protecting Systems, of which the following is a full, clear, and exact description, reference being had to the accompanying drawings.

This invention relates to a system or apparatus which is capable of being used interchangeably for irrigating purposes and for frost-protection purposes. The general object of the invention is to provide a system of this kind which is economical of production and which can be quickly and conveniently converted from one purpose to the other and which will be capable of realizing either of its two functions in an efficient manner.

A further object of the invention is to provide a simple, efficient, and improved frost-protecting system, irrespective of the irrigating feature. Still further and more limited objects of the invention will appear hereinafter and will be realized in and through the combinations of elements embodied in the claims forming part hereof.

In the drawings, Fig. 1 represents a diagrammatic sectional view of my apparatus, illustrating its adaptability for both irrigating and frost-protecting purposes; Fig. 2 a detail in sectional elevation of one of the branch pipes having an irrigating nozzle applied thereto; Fig. 3 a detail in sectional elevation of one of the branch pipes showing the arrangement of the cooperating parts employed for frost protection; and Fig. 4 a plan view of the parts shown in Fig. 3.

Describing by reference characters the various parts illustrated herein, 1 denotes an ordinary pressure pump, the piston of the same being indicated as conventionally driven by a crank disk 2, a link 3, and a connecting rod 4.

Communicating with the suction side of the pump is a supply pipe 5 having a vertical branch 6 by which it is directly connected to the pump cylinder. From the delivery end of the pump there extends a branch pipe 6 and a delivery pipe 7, which is preferably buried beneath the surface of the ground, for frost-protection, said pipe being provided with vertical branches 8 extending above the ground and provided each with a valve 9.

The upper end of each branch pipe 8 is shown as threaded, and to certain of these branch pipes there are applied irrigating nozzles, such as shown in Fig. 2, each nozzle having a central threaded portion 10 by which it is mounted upon the top of the branch pipe. This central connecting portion constitutes the bottom of a yoked or branched body 11 having oppositely and upwardly extending passageways 12 therein, the outer ends of such passageways communicating with the spray nozzles 13, which may be threaded into said branches and which are shown as provided with slots or perforations 14.

When it is desired to use this system for irrigating purposes, all of the vertical branch pipes 8 will be provided with the aforesaid spray nozzles, and water will be taken by the pump 1 from any suitable source of supply through the pipe 5 and will be delivered by said pump through the pipe 7, the branches 8 and the nozzles 13.

When it is desired to use the system for frost protection, the construction illustrated at the left hand of Fig. 1 and in Figs. 3 and 4 will be used. The nozzles 11 will be removed, and burners, indicated generally at 15, will be substituted for said nozzles. The burners may be of any approved construction, the one shown herein having each a central sleeve 16 adapted to be threaded upon the upper end of a branch pipe 8, a casing 17 having a central threaded support 18 carried by spider arms 19 from the wall of the casing, a burner cap 20 having a stem threaded into the support 18 and adapted, by its adjustment, to vary the width of the annular slot 21 provided between said cap and the top of the burner 15, for the escape of liquid fuel. This annular slot 21 may be provided between an outwardly tapered face 20ᵃ on the cap 20 and a correspondingly tapered face 15ᵃ on the upper end of the burner casing 15, so that, when the oil is forced out through this slot under pressure, it will be discharged in an outwardly and upwardly flaring spray.

For the purpose of protecting each burner and facilitating the combustion of the liquid fuel, hoods are provided, as shown more particularly in Fig. 3. Each hood comprises a casing 22, preferably cylindrical and having a partition 23 intermediate the top and bottom thereof and in position to cooperate with the top of a branch pipe 8. Each partition is provided with a central opening for the reception of the upper end of the branch pipe 8 and for the central sleeve 16 of a burner. In addition, each partition is provided with openings 24 which are arranged to admit air to the fluid fuel discharged and sprayed through the slot 21, air being admitted to each hood below the partition thereof through suitable openings 25.

Any convenient or conventional means may be employed for supplying oil to the pump 1. It is contemplated that the same pipe 7 may be used for the supply of oil to the burners that is used for supplying water to the spray nozzle, it being only necessary to drain the water pipe, or the part thereof employed for the conduction of oil.

Oil may be supplied to the inlet or suction side of the pump 1 by means of a pipe 26 communicating at one end with any source of oil supply and at its other end with the vertical branch 6 of the pipe which normally conducts water to the pump, a suitable valve or valves 27 being employed to isolate one liquid from the other. When oil is used, a by-pass connection 28 may be inserted between the pipes 6 and 7ᵃ, said connection having a check valve 29 therein which is adapted to open and allow the oil to by-pass when a predetermined pressure is reached in the pipe 7, said check valve being indicated as provided with an ordinary closing screw 29ᵃ, to shut the valve when water is being pumped.

By the system disclosed herein, I am able to conveniently, and at comparatively small cost, combine irrigation with frost protection, employing a common system of pipe lines for this purpose, and providing means whereby the system may be quickly, conveniently, and economically converted from an irrigating system to a heating system, and vice versa; also to provide a heating system wherein the liquid fuel may be burned with substantially complete combustion and without the development of a smudge or smoke, which has been found to be objectionable in the treatment of certain crops.

Having thus described my invention, what I claim is:

1. In a system or apparatus of the character set forth, the combination of a pump, a pipe communicating with the inlet side thereof, a pipe extending from the delivery side thereof and provided with a plurality of branch pipes each having a valve therein, said branch pipes having means for securing either burners or spray nozzles thereto, means for supplying water and means for supplying fluid fuel to the first-mentioned pipe, and a by-pass connection between the first and second pipes, said connection having a valve therein adapted to permit circulation from the second pipe to the first pipe upon the development of a predetermined pressure.

2. In a system or apparatus of the character described, the combination of a supply pipe located beneath the soil to be irrigated, branch pipes projecting upwardly from said supply pipe and having their ends extending above such soil and provided each with a valve, said branch pipes having means for securing either burners or spray nozzles thereto, burner hoods adapted to surround the burners and to rest upon the soil, and means for supplying water and means for supplying fluid fuel through said supply pipe to said branch pipe.

3. A heating system of the character described comprising a supply pipe extending beneath the soil and provided with vertical branches projecting upwardly through such soil, burners connected to and associated with said branch pipes, each burner comprising a liquid spraying or atomizing device and a hood surrounding such device and the upper end of its branch pipe and having a perforated partition located below the spraying device, the said hood having one or more openings for the admission of air beneath said partition.

4. A heating system of the character described comprising a supply pipe extending beneath the soil and provided with vertical branches projecting upwardly through such soil, and burners connected to and associated with said branch pipes, and a hood surrounding each burner and the upper end of its branch pipe and having means for supplying air to such burner.

5. A heating device for the purpose described comprising a vertically extending pipe having its upper end provided with a thread, a hood surrounding the said pipe and having a partition provided with a central opening adapted to receive the upper end of the pipe, and an oil-atomizing device adapted to deliver the oil in an upwardly and outwardly directed spray, the said device having a sleeve extending through the opening in said partition and threaded upon the pipe, the said partition being provided with openings therethrough for the admission of air to said spray and the hood having one or more openings in the wall below said partition.

6. A heating device for the purpose described comprising a vertically extending pipe having a burner at its upper end, a hood surrounding the said pipe and burner and having a partition below such burner, the said partition being provided with openings therethrough for the admission of air to said burner and the hood having one or more openings in the wall below said partition.

In testimony whereof, I hereunto affix my signature.

CHARLES C. RUPRECHT.